(12) United States Patent
Ji et al.

(10) Patent No.: US 8,472,463 B1
(45) Date of Patent: Jun. 25, 2013

(54) DEVICES, SYSTEMS, AND/OR METHODS FOR MANAGING WIRELESS NETWORKS

(75) Inventors: Lusheng Ji, Randolph, NJ (US); Robert Miller, Convent Stn, NJ (US); Harry Worstell, Florham Park, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1141 days.

(21) Appl. No.: 11/805,191

(22) Filed: May 22, 2007

(51) Int. Cl.
*H04L 12/00* (2006.01)

(52) U.S. Cl.
USPC .......................................... 370/439; 455/450

(58) Field of Classification Search
USPC .................. 370/336–338, 311, 329, 345–350
See application file for complete search history.

(56) References Cited

U.S. PATENT DOCUMENTS

| 6,813,279 | B1 * | 11/2004 | Trainin .......................... 370/466 |
| 2003/0163579 | A1 | 8/2003 | Knauerhase et al. |
| 2004/0013128 | A1 | 1/2004 | Moreton et al. |
| 2004/0042434 | A1 * | 3/2004 | Kennedy ........................ 370/338 |
| 2004/0058686 | A1 * | 3/2004 | Odman .......................... 455/450 |
| 2005/0068928 | A1 | 3/2005 | Smith et al. |
| 2005/0128988 | A1 * | 6/2005 | Simpson et al. ............... 370/338 |
| 2006/0056377 | A1 | 3/2006 | Wu et al. |
| 2006/0092868 | A1 * | 5/2006 | Meier ............................ 370/312 |
| 2006/0285507 | A1 | 12/2006 | Kinder et al. |

OTHER PUBLICATIONS

Sinem Coleri Ergen, ZigBee/IEEE 802.15.4 Summary, Sep. 10, 2004, Berkeley.*

* cited by examiner

*Primary Examiner* — Marcos Batista
(74) *Attorney, Agent, or Firm* — Toler Law Group, PC

(57) ABSTRACT

Certain exemplary embodiments comprise a method that can comprise wirelessly transmitting a thin Beacon message from an Access Point in a wireless local area network cell. The thin Beacon message can be transmitted during a superframe subsequent to a Beacon message. The thin Beacon message can be transmitted at a predetermined thin Beacon time interval. The time period between consecutive Beacon and/or thin Beacon messages can be divided further into a thin CFP and a thin CP.

20 Claims, 5 Drawing Sheets

DEVICES, SYSTEMS, AND/OR METHODS FOR MANAGING WIRELESS NETWORKS

BACKGROUND

United States Patent Publication No. 20060285507 (Kinder), which is incorporated by reference herein in its entirety, allegedly discloses a "method, apparatus, and software containing computer readable code to implement the method implemented in a first wireless device, e.g., an access point. The method includes, for a particular network identifier, e.g., BSSID, of at least one network identifier supported by the first wireless device that including a transmitter and modulator, each network identifier identifying a wireless network, e.g., an IEEE 802.11 BSS for which the first wireless device acts as an access point, transmitting full parent beacon frames periodically at the beacon frame rate for the particular network identifier; and transmitting at least one mini-beacon frames in between consecutive full parent beacon frames for the particular network identifier. Each mini beacon frame includes a subset of the information in a full parent beacon frame, and further including timing information indicative of when the next full parent beacon frame will be transmitted for the particular network identifier." See Abstract.

United States Patent Publication No. 20050128988 (Simpson), which is incorporated by reference herein in its entirety, allegedly discloses the "invention provides an enhanced passive scanning method for a wireless local area network, including the steps of transmitting at least one of a beacon signal or a gratuitous probe response in a WLAN channel by an access point. The gratuitous probe response is a supplemental beacon signal that is transmitted at intervals between the occurrence of regular beacon signals, but contains only essential information to allow mobile station manage roaming and timing." See Abstract.

United States Patent Publication No. 20030163579 (Knauerhase), which is incorporated by reference herein in its entirety, allegedly discloses a "method is described for adaptive load-balancing and graceful termination of access points in a network having a plurality of access points. The method includes determining a need to reduce a load of a first access point, and increasing a Beacon interval corresponding to the first access point in order to detract clients. Correspondingly, Beacon intervals for other access points may be reduced in order to attract more clients." See Abstract.

SUMMARY

Certain exemplary embodiments comprise a method that can comprise wirelessly transmitting a thin Beacon message from an Access Point in a wireless local area network cell. The thin Beacon message can be transmitted during a superframe subsequent to a Beacon message. The thin Beacon message can be transmitted at a predetermined thin Beacon time interval. The time period between consecutive Beacon and/or thin Beacon messages can be divided further into a thin CFP and a thin CP.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments provide a method that can comprise wirelessly transmitting a thin Beacon message from an Access. Point in a wireless local area network cell. The thin Beacon message can be transmitted during a superframe subsequent to a Beacon message. The thin Beacon message can be transmitted at a predetermined thin Beacon time interval.

In Wireless Local Area Network (WLAN) systems that implement the IEEE 802.11 standard, a group of client devices can be managed and/or controlled by a device called an Access Point (AP), collectively form a Basic Service Set (BSS). Client devices within the wireless communication coverage of an AP can select to associate with the AP and become a member of a BSS of the AP. In addition to managing communications within its BSS, an AP can be connected to a Distribution System, which can be a wired Local Area Network such as Ethernet, and provides data forwarding services between the Distribution System network and an associated BSS.

An AP can organize communications within the associated BSS by dividing air time into small pieces called superframes. The duration of each superframe can be configurable and approximately 100 milliseconds can be a potential configuration. At the beginning of each superframe, the AP can broadcast a special message called a Beacon message. The Beacon message can mark a beginning of a new superframe. A superframe duration can be called a Beacon interval.

Figure 1:
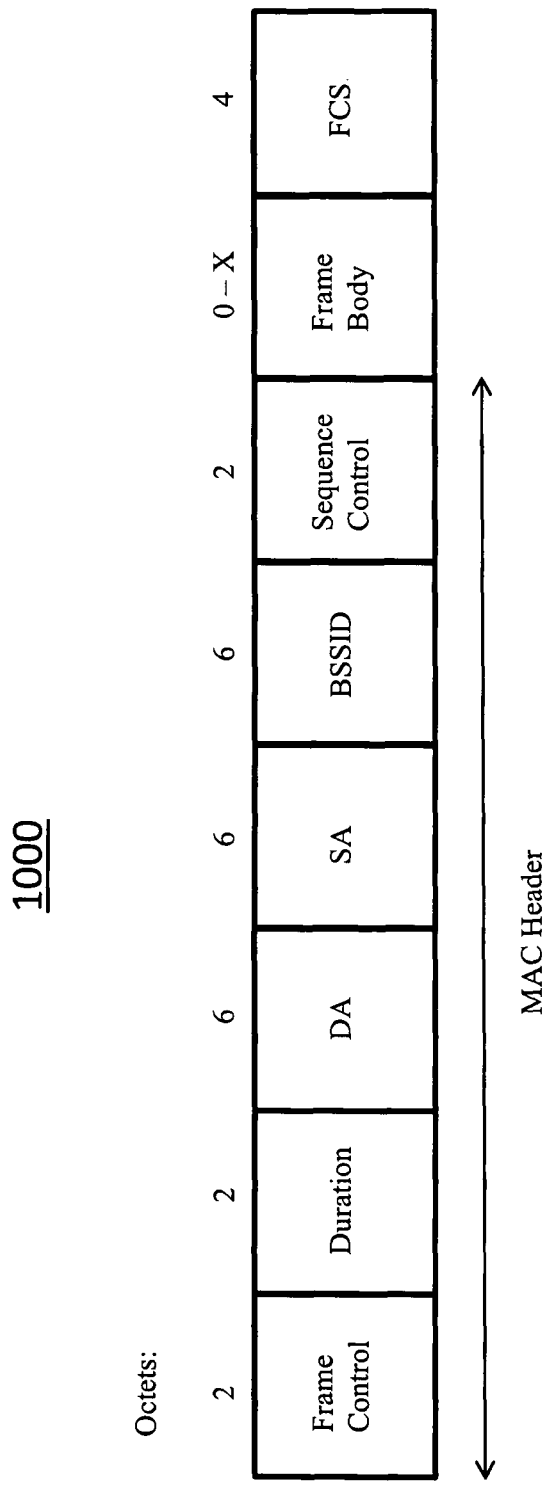
FIG. 1 is a block diagram of an exemplary embodiment of a Beacon 1000.

FIG. 1 is a block diagram of a Beacon message 1000, which can comprise a subfield called, e.g., "Subtype", within, e.g., a "Frame Control" field in Beacon message 1000. The subtype field can comprise an identifier which uniquely identifies the type of the frame. In the case of a Beacon message, the Subtype field can be set to a four-bit binary number of 1000. The "Frame Body" field of a Beacon message can comprise a number of additional subfields, which can comprise timestamp, Beacon interval, capabilities, Service Set Identifier (SSID), supported rate, and/or other information elements, etc.

Beacon messages can serve a number of purposes, such as synchronizing timing (clocks) within the BSS via a timestamp, and can declare a presence of the BSS and various communication parameters supported within the BSS by the AP.

The IEEE 802.11 standard can support at least two channel access methods. A first of these methods can be called a contention-based method using the Carrier Sense Multiple Access/Collision Avoidance (CSMA/CA) algorithm. In this method, since members can compete for channel access, each period of time when the BSS is using CSMA/CA method can be called a Contention Period (CP). A second of these methods can be called a polling-based method with which the AP can poll particular BSS members to invite the polled members to access the channel while all other members remain silent. Hence each period of time when the polled channel access is in use can be called a Contention-Free Period (CFP). Generally speaking, because the channel access performance can be deterministic in CFP, CFPs can be the preferred periods for scheduling transmissions for applications with high QoS requirements, e.g., VoIP.

Correspondingly, certain exemplary embodiments can define at least two operation modes for an AP. A Distributed Coordination Function (DCF) mode might permit only CSMA/CA channel accesses. In other words, the whole superframe can be used as a CP. Under the Point Coordination Function (PCF), each superframe can be divided into one CFP followed by one CP. An AP can declare an operation mode using two subfields in a "Capabilities" field of Beacon messages and/or an information element describing the CFP.

When the AP is executing PCF, Beacon messages can carry a descriptor for the CFP, such as the maximum duration of the CFP. A CFP can begin after the transmission of a Beacon message. A CFP can end at a time declared by a Beacon message preceding the CFP, or the AP can end the CFP at a suitable time before that with a CF-End message. After the end of a CFP, the CP can begin, and can last until the next Beacon message with a CFP descriptor, which can start the next CFP.

In BSS's that alternate between CFP and CP, a gap between two consecutive CFPs, which can be the duration of the CP, might be too long for applications with high QoS requirements. For example, a highest frequency that the CFP and CP might alternate can be to have one CFP and one CP within the same Beacon interval. In certain exemplary embodiments, the Beacon interval can be approximately 100 milliseconds. Applications such as VoIP, however, can generate packets approximately every 10 milliseconds. If the CP duration exceeds 10 milliseconds, at least one VoIP packet might be transmitted during CP and the quality of the transmission might become unpredictable.

Certain exemplary embodiments can attempt to reduce superframe size and thereby define CFPs and/or CPs more often. For example, by reducing the superframe duration to 10 milliseconds, a one-packet-every-10 milliseconds VoIP stream can be accommodated because there is one CFP associated with each 10 milliseconds superframe. However, Beacon messages can be fairly large packets. As features are added to the IEEE 802.11 standard, many such features might need to be announced in each Beacon message. This might make Beacon messages increasingly larger as the IEEE 802.11 technology evolves. In addition, the Beacon messages can be transmitted at a special data rate called a "Basic Rate", which can be significantly slower than a data rate for transmitting a regular data packet, for the following reason. Packets transmitted at lower rate can be encoded using modulation schemes with larger processing gain. In other words, packets transmitted at slower rate can be received at locations that might be farther away. Hence using slow "basic rate" to transmit Beacon messages can make Beacon messages reach farther. Combining both effects, transmitting Beacon messages can utilize a relatively large amount of airtime in a wireless network. Reducing superframe size can result in more Beacon message transmissions over a same amount of time, which can take valuable airtime away from user data transmissions.

Certain exemplary embodiments comprise a method that can define contention-free channel access periods and/or contention channel access periods at a higher frequency than with IEEE 802.11 superframes. The method can comprise wirelessly transmitting a thin Beacon message from an Access Point in a wireless local area network cell. The thin Beacon message can be transmitted during a superframe subsequent to a Beacon message. The thin Beacon message can be transmitted at a predetermined thin Beacon time interval. The time period between consecutive Beacon and/or thin Beacon messages can be divided further into a thin CFP and a thin CP.

In certain exemplary embodiments, a thin Beacon message can be formatted according to a unique subset of fields comprised by Beacon message 1000. In certain exemplary embodiments, a frame body of the thin Beacon message can be characterized by a frame body that consists essentially of a timestamp adapted to synchronize entities receiving said thin Beacon message; an identification of a Basic Service Set associated with said Beacon message; a count of thin Beacon messages to be transmitted prior to a transmission of a next Beacon message; and/or information regarding said this contention-free period and said this contention period. Lengths and/or actual encoding methods of individual fields of the thin Beacon message can vary in certain exemplary embodiments and/or can be determined by those familiar with the art. In certain exemplary embodiments, a time stamp in a thin Beacon message can follow a format of a Beacon message and/or can be 8 octets in length. In certain exemplary embodiments, an identification of a BSS in the thin Beacon message can follow the format of Beacon message and/or can be 6 octets in length. In certain exemplary embodiments, a count of remaining thin Beacons in the thin Beacon message can be of any length. However, since the length of the Beacon message field can limit a count of thin Beacon intervals within a single Beacon interval, certain exemplary embodiments can use field length of 1 octet. In certain exemplary embodiments, the information regarding thin CFP and/or thin CP can be of 2 octets. In certain exemplary embodiments, the information regarding thin CFP and/or thin CP can specify a duration of the thin CFP that immediately follows the completion of transmission/reception of a thin Beacon in a same unit as the timestamp. In certain exemplary embodiments, the information regarding thin CFP and/or thin CP can be 2 octets in length or longer.

Certain exemplary embodiments provide a method for improving Wireless LAN service quality. Certain exemplary embodiments introduce a new type of Beacon message that can be called a "thin Beacon message". In a thin Beacon message, information items that are related to CFP can be retained. Because of a reduced size, thin Beacon messages can be transmitted at higher frequency compared to regular Beacon messages without introducing too much overhead. In between two consecutive thin Beacon messages or a thin Beacon message and a regular Beacon a period called a "thin Beacon interval" can be defined. Each thin Beacon interval can be further divided into a thin CFP and/or a thin CP. Thin Beacon messages can enable Wireless LAN systems to have fine granularity schedules for arranging packet transmissions in a relatively efficient fashion. Because each thin Beacon message can comprise a timestamp, operations of the members in a BSS implementing the present invention can also be relatively tightly synchronized.

Certain exemplary embodiments provide a new message type called the thin Beacon message. The thin Beacon message can be adapted to enable Wireless LAN systems to have relatively small thin Beacon interval durations. Since within each thin Beacon interval, there can be one CFP (referred to hereafter as a thin CFP) followed by one CP (referred to hereafter as a thin CP), using relatively short thin Beacon intervals means that Wireless LAN systems can have relatively frequent opportunities for scheduling contention-free transmissions. To separate the new names and concepts associated to thin Beacon, hereafter names and concepts associated with the IEEE 802.11 standard are referred to as "regular", such as regular CFP, regular Beacon, etc.

Because the message is used in an IEEE 802.11 Wireless LAN system, the header of the thin Beacon message can follow a same format as all IEEE 802.11 frames. That is, each thin Beacon message can begin with a field called "Frame Control". The contents of this field can be written according to the IEEE 802.11 standard, with a type code that identifies the message being a thin Beacon message.

Following the Frame Control field, each thin Beacon message can comprise several pieces of key information, such as, a BSS ID (which can identify the BSS the thin Beacon message serves); a timestamp (which can be set according to the AP's local clock to help synchronizing operations in the BSS); a Time to Regular Beacon (TRB) field (which can indicate how much time remains before the AP is scheduled to transmit a regular Beacon message), and/or a thin CFP Duration (TCD) field (which can specify a duration of a the thin CFP following the thin Beacon message).

In addition to the regular Beacon interval, each AP can be configured with a thin Beacon Interval (TBI), which is smaller than the regular Beacon interval. TBI can be determined based on the traffic characteristics of the type of applications the Wireless LAN system supports. For example, if an application with a highest QoS requirement is a VoIP application running a G711 codec with packet rate of one packet approximately every 20 milliseconds, certain exemplary embodiments can set the TBI to approximately 20 milliseconds. In such embodiments, approximately every 20 milliseconds the BSS can have an opportunity window for contention-free transmissions.

Just like at the beginning of each regular Beacon interval a Beacon message can be scheduled to be transmitted, at the beginning of each TBI a thin Beacon message can be scheduled to be transmitted. The boundaries of the TBIs might or might not be aligned with boundaries of the regular Beacon intervals. Certain exemplary embodiments can provide a separate timer to track the TBIs such that when the timer reaches a predetermined level, a beginning of a new TBI can be indicated and/or marked.

There might be different ways for how to handle the transmission of a thin Beacon message. A preferred embodiment depends on factors such as whether the AP can access the channel to transmit the thin Beacon message, and whether the BSS is current in a CFP or about to enter a CFP.

Figure 2:
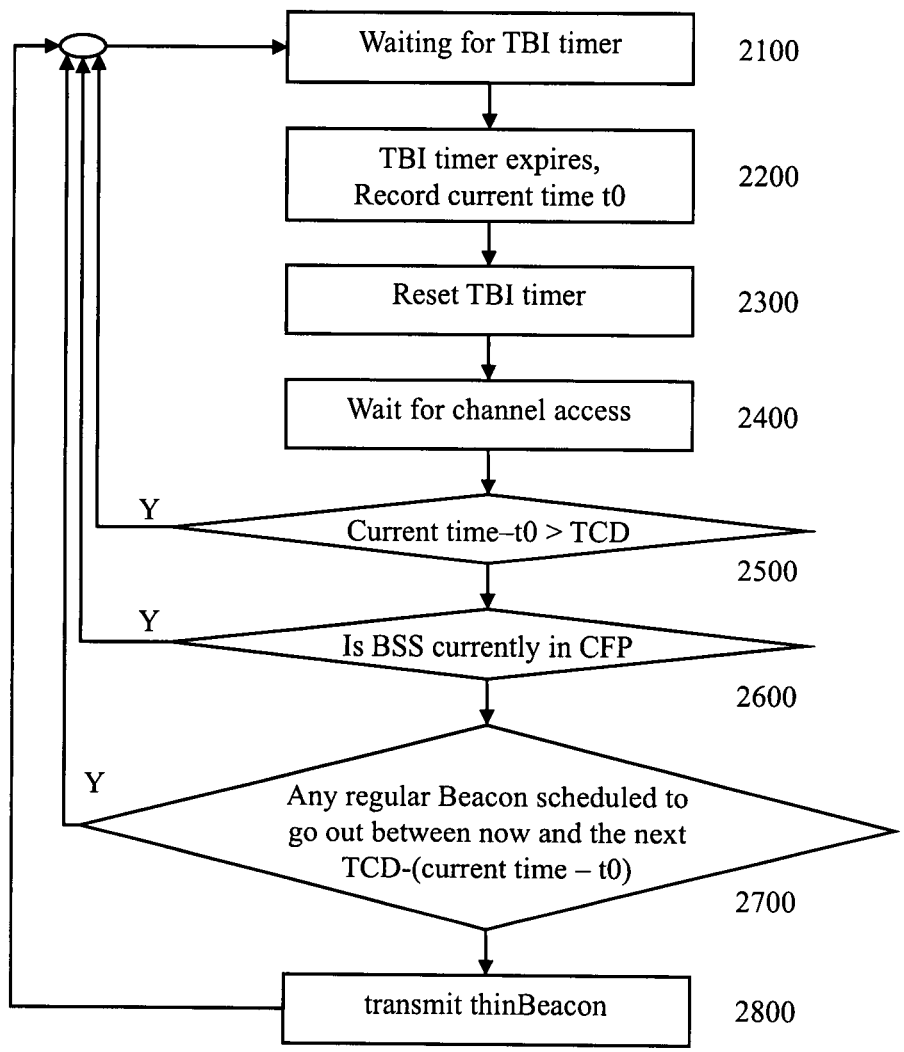
FIG. 2 is a flowchart of an exemplary embodiment of a method 2000.

FIG. 2 is a flowchart of an exemplary embodiment of a method 2000, which can apply to thin Beacon message scheduling and transmission. At activity 2100, the cycle can begin with waiting for TBI timer to expire. At activity 2200, the TBI timer can expire and the AP can record a time the TBI expires as T0. T0 can be the time that a TBI should start. At activity 2300, the TBI timer can be reset again such that a start of a next TBI can be triggered.

At activity 2400, certain exemplary embodiments can wait for channel access. If the AP fails to access the channel, the transmission of a scheduled thin Beacon message can be postponed. At activity 2400 a current time less T0 can be compared to TCD. If a delay exceeds TCD, a transmission of the current Beacon can be cancelled. At activity 2600, a determination can be made whether the BSS is currently in CFP. In the case that the BSS can be already under CFP and the remaining time of the CFP can exceed TCD, the transmission of the thin Beacon message can also be cancelled. At activity 2700, a determination can be made whether any regular Beacon message is scheduled for transmission during a time interval of TCD less a current time less T0. If the amount of time till the scheduled transmission time of the next regular Beacon message is less than TCD, the transmission of the thin Beacon message can also be cancelled. As a result, thin Beacon messages might only be transmitted during the CPs of regular superframes, and thin CFPs might not interfere with the transmissions of regular Beacon messages. At activity 2800, the thin Beacon message can be transmitted.

After the transmission of a thin Beacon message, the BSS can enter a thin CFP for a period specified by TCD of the thin Beacon message. After the thin CFP ends the remainder of the TBI can become a thin CP. The AP might also use a transmit a CF-End message, which can be adapted to terminate a thin CFP prematurely if it determines that there is not more QoS traffic waiting in queues that desires CFP service.

Upon receiving a thin Beacon message, BSS member stations can enter a thin CFP for a period specified by TCD of the thin Beacon message. For IEEE 802.11 compatible stations, a method for accomplishing this can be to set their Network Allocation Vector (NAV) timers to a same value as the TCD. Setting the NAV timers can block stations from attempting to transmit except when polled by the AP.

In certain exemplary embodiments, the thin Beacon message can serve BSS members that have relatively high QoS requirements, which might imply that thin Beacon messages might not need to reach relatively distant locations. Thus thin Beacon messages might not be transmitted at a basic rate. Instead, certain exemplary embodiments can be transmitted at a regular data rate. In BSSs that support multiple data rates, the AP might use a different data rate to communicate with different members. In such embodiments, the thin Beacon messages can be transmitted at a lowest data rate among data rates the AP uses to communicate with current members of the BSS.

Figure 3:
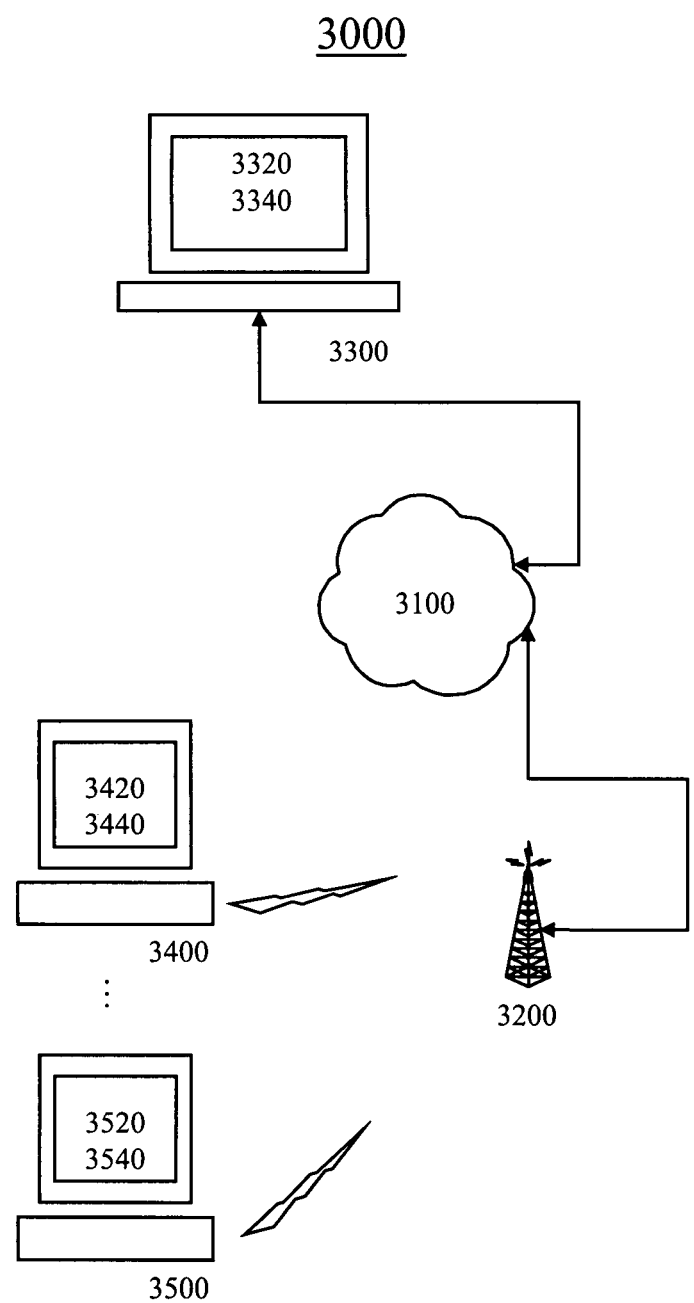
FIG. 3 is a block diagram of an exemplary embodiment of a system 3000.

FIG. 3 is a block diagram of an exemplary embodiment of a system 3000, which can comprise a network 3100. As used herein the term can means is capable of, in at least some embodiments. As used herein the term comprise means to include but not be limited to. As used herein the term network means a communicatively coupled plurality of nodes, communication devices, and/or information devices. As used herein the term system means a collection of mechanisms, devices, data, and/or instructions, the collection designed to perform one or more specific functions. Via a network, such devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, IEEE 802.11n, X-10, electrical power, multi-domain, and/or multi-zone sub-network and/or protocol, one or more Internet service providers, and/ or one or more information devices, such as a switch, router, and/or gateway not directly connected to a local area network, etc., and/or any equivalents thereof. As used herein the term utilize means to use and/or put into service. As used herein the term via means by way of and/or utilizing.

As used herein the term wireless means any communication technique that transmits a signal that does not require the use of a wire and/or guide connecting a transmitter and a receiver and/or utilizes electromagnetic waves emitted by an antenna (i.e., via an unguided medium), including such communication techniques as sonar, radio, cellular, cellular radio, digital cellular radio, ELF, LF, MF, HF, VHF, UHF, SHF, EHF, radar, microwave, satellite microwave, laser, infrared, etc., but excluding purely visual signaling, such as semaphore, smoke signals, sign language, etc., the communication technique having a baseband and/or carrier frequency ranging from about 1 Hz to about $2 \times 10^{14}$ Hz (about 200 teraHertz), including all values therebetween, such as for example, about 40 Hz, 6.010 kHz, 8.7 MHz, 4.518 GHz, 30 GHz, etc. and including all subranges therebetween, such as for example, from about 100 kHz to about 100 MHz, about 30 MHz to about 1 GHz, about 3 kHz to about 300 GHz, etc. Wireless communications can include analog and/or digital data, signals, and/or transmissions. Wireless communication can be via any of a plurality of protocols such as, for example, cellular CDMA, TDMA, GSM, GPRS, UMTS, W-CDMA, CDMA2000, TD-CDMA, 802.11a, 802.11b, 802.11g, 802.15.1, 802.15.4, 802.16, and/or Bluetooth, etc.

As used herein the term network interface means any physical and/or logical device, system, and/or process capable of coupling an information device to a network. Exemplary network interfaces comprise a telephone, cellular phone, cellular modem, telephone data modem, fax modem, wireless transceiver, Ethernet card, cable modem, digital subscriber line interface, bridge, hub, router, or other similar device, software to manage such a device, and/or software to provide a function of such a device. As used herein the term plurality means the state of being plural and/or more than one.

Network 3100 can comprise and/or be communicatively coupled to a wired network such as the Internet or a Local Area Network. Network 3100 can communicatively couple information devices such as information device 3300.

As used herein the term information means facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information. As used herein the term information device means any device on which resides a finite state machine capable of implementing at least a portion of a method, structure, and/or or graphical user interface described herein. An information device can comprise well-known communicatively coupled components, such as one or more network interfaces, one or more processors, one or more memories containing instructions, one or more input/output (I/O) devices, and/or one or more user interfaces (e.g., coupled to an I/O device) via which information can be rendered to implement one or more functions described herein. For example, an information device can be any general purpose and/or special purpose computer, such as a personal computer, video game system (e.g., PlayStation, Nintendo Gameboy, X-Box, etc.), workstation, server, minicomputer, mainframe, supercomputer, computer terminal, laptop, wearable computer, and/or Personal Digital Assistant (PDA), iPod, mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, a digital signal processor, an ASIC or other integrated circuit, a hardware electronic logic circuit such as a discrete element circuit, and/or a programmable logic device such as a PLD, PLA, FPGA, or PAL, or the like, etc.

As used herein the term processor means a hardware, firmware, and/or software machine and/or virtual machine comprising a set of machine-readable instructions adaptable to perform a specific task. A processor can utilize mechanical, pneumatic, hydraulic, electrical, magnetic, optical, informational, chemical, and/or biological principles, mechanisms, signals, and/or inputs to perform the task(s). In certain embodiments, a processor can act upon information by manipulating, analyzing, modifying, and/or converting it, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

As used herein the term signal means information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

As used herein the term haptic means both the human sense of kinesthetic movement and the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity. As used herein the term input/output (I/O) device means any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected. As used herein the term interface means (n) a boundary across which two independent systems, and/or one system acting as two or more independent systems, meet and act on and/or communicate with each other.

As used herein the term communicatively couple means to link in a manner that facilitates communications. As used herein the term device means a machine, manufacture, and/or collection thereof. Information device 3300 can comprise a user interface 3320 and/or a user program 3340. User interface 3320 and/or user program 3340 can be communicatively coupled to a wireless network via an Access Point 3200. Access Point 3200 can be adapted to communicate with a plurality of wirelessly communicating information devices such as information device 3400 and information device 3500. Information device 3400 can comprise a user interface 3420 and/or a user program 3440. Via user interface 3420 and user program 3440, a user of information device 3400 can communicate with a user of information device 3300 and/or information device 3500. Information device 3500 can comprise a user interface 3520 and/or a user program 3540. Via user interface 3520 and user program 3540, a user of information device 3500 can communicate with a user of information device 3300 and/or information device 3400.

As used herein the term user interface means a device and/or software program for rendering information to a user and/or requesting information from the user. A user interface can include at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

Figure 4:
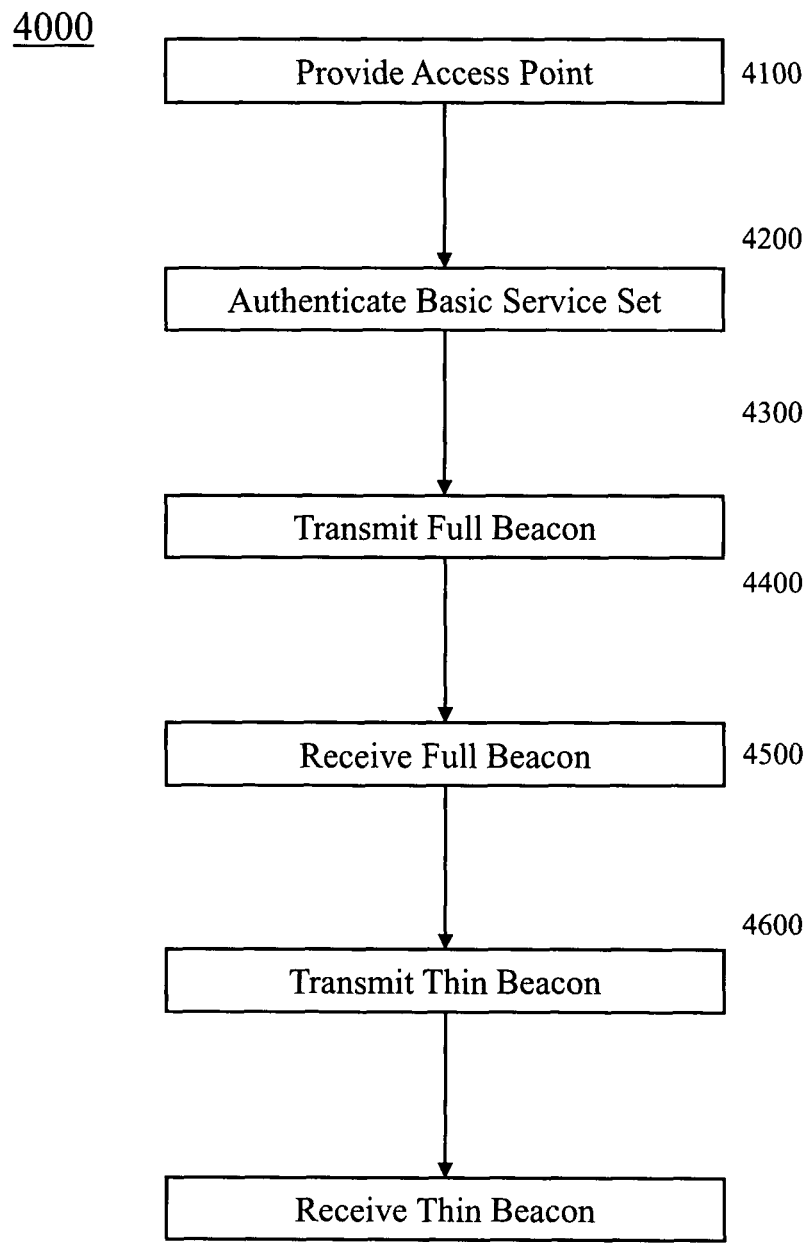
FIG. 4 is a flowchart of an exemplary embodiment of a method 4000.

FIG. 4 is a flowchart of an exemplary embodiment of a method 4000. As used herein the term a means at least one. As used herein the term method means a process, procedure, and/or collection of related activities for accomplishing something. At activity 4100, an Access Point can be provided to a wireless network. As used herein the term Access Point means a device that communicatively couples one or more wirelessly communicating devices to a distribution system network such as a local area network and/or a wide area network. As used herein the term activity means an action, act, deed, function, step, and/or process and/or a portion thereof. As used herein the term and/or means either in conjunction with or in alternative to. As used herein the term distribution system network means a network via which telecommunications messages are routed. As used herein the term local area network means a data communications network that is geographically limited (typically to a 1 km radius). As used herein the term provide means to furnish, supply, give, convey, send, and/or make available. As used herein the term send means to convey. The Access Point can be adapted to communicatively couple one or more wirelessly transceiving devices. The Access Point can be adapted to transmit and/or receive signals in accordance with an IEEE 802.11 protocol. As used herein the term, adapted to means suitable, fit, and/or capable of performing a specified function. As used herein the term Institute of Electrical and Electronics Engineers (IEEE) 802.11 means a standard of wireless communications established by the Institute of Electrical and Electronics Engineers. As used herein the term receive means to gather, take, acquire, obtain, accept, get, and/or have bestowed upon. The local area network cell and/or Access Point can be adapted to allow contention-free periods and contention periods at higher frequencies than supported by 802.11 frames.

The Access Point can define and/or be associated with a wireless local area network cell, which can be adapted to utilize Institute of Electrical and Electronics Engineers 802.11 frames. As used herein the term Institute of Electrical and Electronics Engineers (IEEE) 802.11 frames means a packet encoded for transmission in a format compliant with at least one IEEE 802.11 specification. As used herein the term associated with means related to. As used herein the term define means to establish the meaning, relationship, outline, form, and/or structure of; and/or to precisely and/or distinctly describe and/or specify. As used herein the term frame means a packet encoded for transmission via a medium. As used herein the term transmission means an electronic communication of a message. As used herein the term transmit means to provide, furnish, supply, send as a signal, and/or to convey (e.g., force, energy, and/or information) from one place and/or thing to another. The wireless local area network cell can be called a Basic Service Set. As used herein the term Basic Service Set means a group of wirelessly communicating entities communicatively coupled to a distribution system network via an Access Point. As used herein the term cell means a basic geographical unit of a cellular communications system that is serviced by a single access point. The Access Point can be adapted to control wireless communications between devices communicatively coupled via the wireless local area network BSS. As used herein the term between means in a separating interval and/or intermediate to.

At activity 4200, BSS members can be authenticated. The BSS can comprise the one or more wirelessly transceiving devices communicatively coupled via the Access Point. The BSS can be associated with a Service Set Identifier (SSID) value.

At activity 4300, a Beacon message can be transmitted. As used herein the term Beacon message means a packet transmitted from an Access Point of a wireless network at predetermined time intervals, the packet defining one or more contention periods and one or more contention-free periods in a superframe, the packet comprising a timestamp, beacon interval, Basic Service Set identifier, supported communication rates associated with the wireless network, parameter sets associated with the wireless network, and/or a traffic indication map. As used herein the term predetermined means established in advance. As used herein the term from means used to indicate a source. As used herein the term superframe means a time division established for transmission of packets, the packets formatted in accordance with an IEEE 802.11 protocol, the time division comprising a contention-free period and a contention period. As used herein the term time interval means a quantity and/or finite amount of time between two specified instants, events, and/or states. As used herein the term timestamp means a quantitative representation of a time associated with an event. The Beacon message can be transmitted according to a protocol and/or superframe size associated with the IEEE 802.11 protocol. The Beacon message can comprise operation parameters associated with the wireless local area network cell. As used herein the term operation parameters means one or more data values that comprise information regarding communications in a wireless network, the information comprising data encryption rules, supported data transmission rates and/or information regarding signaling methods, etc. As used herein the term regarding means pertaining to. The access point can use Beacon messages to announce the existence of the BSS, operation parameters thereof, and/or coordinate the communications within the BSS. As used herein the term coordinate means to place in an order. A beacon message can be transmitted at the beginning of each superframe, whose duration can be defined by the access point. As used herein the term begin means to start. As used herein the term duration means a measure of a period over which something occurs and/or exists. As used herein the term occur means to take place. The beacon message comprises information regarding the time stamp, the length of the superframe (beacon interval), and other information elements such as the Basic Service set identification, authentication, security methods, supported transmission rates, and/or configurations regarding contention periods and contention-free periods within the superframe, etc. As used herein the term identification means evidence of identity, such as a moniker, description, designation, and/or characteristics, and/or something that uniquely and/or substantially uniquely identifies a person and/or thing. As used herein the term length means a time duration of a frame. As used herein the term substantially means to a considerable, large, and/or great, but not necessarily whole and/or entire, extent and/or degree.

Beacon messages can comprise specification announcements for the BSS. As used herein the term for means with a purpose of. In doing so the beacon messages can comprise communication parameters known as information elements. The overhead of transmitting Beacon messages can be substantial. In certain exemplary embodiments, the shorter the Beacon interval is, the more overhead the Beacon message introduces. A relatively short Beacon interval can be desirable for achieving relatively tight time synchronization. As used herein the term synchronize means to cause to agree in time of occurrence.

At activity 4400, a Beacon message signal can be received by entities of the BSS. The Beacon message signal can be adapted to synchronize devices in the BSS and/or provide a CP and/or a CFP for transmission of data by the entities. As used herein the term data means information represented in a form suitable for processing by an information device.

In certain applications, tighter synchronization can be desired than is generally provided in IEEE 802.11 wireless networking systems.

At activity 4500, a thin Beacon message can be transmitted from the Access Point in the wireless local area network cell. As used herein the term thin Beacon message means a signal comprising a timestamp that is transmitted from an Access Point and is substantially shorter in duration than a beacon message, the thin Beacon message is transmitted in wireless local area network cell adapted to utilize Institute of Electrical and Electronics Engineers 802.11 frames, the thin Beacon message is transmitted during a superframe subsequent to a Beacon message, the thin Beacon message is transmitted at a beginning of said superframe. As used herein the term time-adjacent pair of thin Beacon messages means a set of two thin Beacon messages that are transmitted sequentially with no thin Beacon messages transmitted therebetween. The thin Beacon message can be transmitted during a superframe subsequent to the Beacon message. As used herein the term subsequent means following in time. The thin Beacon message can be transmitted at a predetermined thin Beacon time interval. The predetermined thin Beacon time interval can be less than a duration of the superframe. As used herein the term less than means having a measurably smaller magnitude and/or degree as compared to something else. Thus, the superframe can have a longer duration than the thin Beacon time interval. As used herein the term longer means having a greater time duration. The predetermined thin Beacon time interval can be divided into a thin contention-free period and a thin contention period. As used herein the term contention-free period means a predetermined time interval during a superframe in which an Access Point of a wireless network assigns each entity communicatively coupled via the wireless network, one at a time, a right to transmit data, wherein the Access Point allows only a single entity of the wireless network to transmit during a given time interval. As used herein the term thin contention-free period means a contention-free period defined by a thin Beacon message. As used herein the term contention period means a predetermined time interval during a superframe during which each entity communicatively coupled via a wireless network can compete with other entities communicatively coupled via the wireless network to transmit data via a wireless network. As used herein the term thin contention period means a contention period defined by a thin Beacon message. As used herein the term divide means to partition. As used herein the term entity means an information device communicatively coupled to other information devices via a wireless network. As used herein the term only means without anything further. As used herein the term wherein means in regard to which; and; and/or in addition to. The thin contention-free period can be within the predetermined thin Beacon time interval and can be adapted to support a finer granularity schedule for the Access Point to coordinate frame transmissions than the Beacon message. As used herein the term finer granularity schedule means one or more time intervals comprising a thin contention-free period and a thin contention period that occur more frequently than a contention-free period and a contention period associated with an Institute of Electrical and Electronics Engineers 802.11 beacon message.

The thin Beacon message can be transmitted at a thin beacon transmission rate that is higher than a transmission rate associated with the Institute of Electrical and Electronics Engineers 802.11 Beacon message. As used herein, the term transmission rate means a time over which a unit quantity of information is transmitted. The thin Beacon message can be shorter than the Institute of Electrical and Electronics Engineers 802.11 Beacon message. As used herein the term shorter means of a lesser duration.

The thin Beacon message can comprise and/or consist essentially of one or more of: a timestamp adapted to synchronize entities receiving the thin Beacon message, an identification of a Basic Service Set associated with the Beacon message, a count of thin Beacon messages to be transmitted prior to a transmission of a next Beacon message, a remaining duration of a time interval until the transmission of the next Beacon message, and/or information regarding the thin contention-free period and the thin contention period. As used herein the term consisting essentially of means limited to the following elements and others that do not materially affect the basic and novel characteristics of the claimed subject matter. As used herein the term count means (n.) a number reached by counting and/or a defined quantity. As used herein the term next means immediately following, as in time, order, or sequence. As used herein the term until means up to a time when. In certain exemplary embodiments the thin Beacon message can lack one or more of operation parameters associated with the wireless local area network cell and comprised in the Beacon message and/or a length of the superframe comprised in the Beacon message. As used herein the term lack means a particular deficiency or absence. In certain exemplary embodiments, the thin Beacon message can define the thin contention period and/or the thin contention-free period.

At activity 4600, a thin Beacon message can be received by an entity of the BSS. The entity can synchronize a clock based upon the thin Beacon message. As used herein the term based upon means determined in consideration of and/or derived from. As used herein the term determine means to obtain, calculate, decide, deduce, establish, and/or ascertain. As used herein the term obtain means to receive, get, take possession of, procure, acquire, calculate, determine, and/or compute. The entity can be adapted to transmit and/or receive a transmission of data during at least one of the thin contention period and the thin contention-free period. In certain exemplary embodiments, the entity can utilize the thin Beacon message for signal strength based location calculations and/or handoff planning. In certain exemplary embodiments, if the entity has not joined the BSS, the entity can utilize the thin Beacon message to determine approximately how long a time interval is until a next Beacon message, thereby the entity can determine whether to go to sleep to save battery energy and wake up right before the next full Beacon message, or better organize a BSS searching method to search for the Access Point.

Any of activities 4100 through 4600 can be performed manually and/or automatically. As used herein the term automatically means acting and/or operating in a manner essentially independent of external human influence and/or control. For example, an automatic light switch can turn on upon "seeing" a person in its view, without the person manually operating the light switch.

Figure 5:
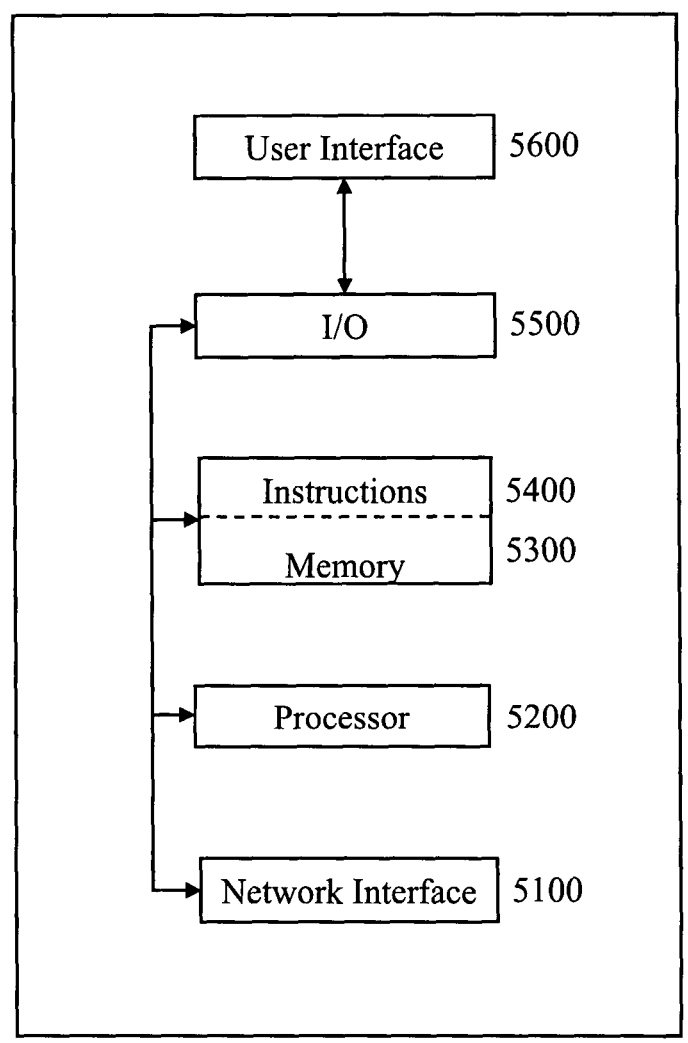
FIG. 5 is a block diagram of an exemplary embodiment of an information device 5000.

FIG. 5 is a block diagram of an exemplary embodiment of an information device 5000, which in certain operative embodiments can comprise, for example, information device 3300, information device 3400, and information device 3500 of FIG. 3. Information device 5000 can comprise any of numerous components, such as for example, one or more network interfaces 5100, one or more processors 5200, one or more memories 5300 containing instructions 5400, one or more input/output (I/O) devices 5500, and/or one or more user interfaces 5600 coupled to I/O device 5500, etc.

Memory 5300 can be a machine-readable medium and/or a memory device. As used herein the term machine-readable medium means a physical structure from which a machine, such as an information device, computer, microprocessor, and/or controller, etc., can obtain and/or store data, information, and/or instructions. Examples include memories, punch cards, and/or optically readable forms, etc. As used herein the term memory device means an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

Information device 5000 can be adapted to execute machine instructions. As used herein the term machine instructions means directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software. As used herein the term store means to place, hold, retain, enter, and/or copy into and/or onto a machine-readable medium.

In certain exemplary embodiments, via one or more user interfaces 5600, such as a graphical user interface, a user can view a rendering of information related to communications via an Access Point and/or information associated with thin Beacon messages. As used herein the term render means to display, annunciate, speak, print, and/or otherwise make perceptible to a human, for example as data, commands, text, graphics, audio, video, animation, and/or hyperlinks, etc., such as via any visual, audio, and/or haptic means, such as via a display, monitor, printer, electric paper, ocular implant, cochlear implant, speaker, etc. As used herein the term said means when used in a system or device claim, an article indicating a subsequent claim term that has been previously introduced.

Note

When terms are used substantively herein, provided definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

Still other practical and useful embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, performed by multiple entities, and/or performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, the descriptions and drawings are to be regarded as illustrative in nature, and not as restrictive.

What is claimed is:

1. A method comprising:
   transmitting a sequence of beacon messages from an access point in a wireless local area network cell, each pair of sequential beacon messages within the sequence of beacon messages separated by a beacon time interval comprising a contention-free period and a contention period; and
   transmitting a thin beacon message during the beacon time interval, the thin beacon message followed subsequently by a thin beacon time interval that is less than the beacon time interval, wherein the thin beacon time interval comprises at least one of a thin contention-free period, a thin contention period, or a combination thereof.

2. The method of claim 1, wherein the thin beacon time interval is less than a duration of a superframe comprising at least one beacon message of the sequence of beacon messages.

3. The method of claim 1, wherein the thin beacon time interval is determined based on a rate of packet transmission associated with a Quality-of-Service of an application configured for data transmission via the access point, and wherein a duration of the beacon time interval is not based on the Quality-of-Service.

4. The method of claim 1, wherein the thin beacon time interval provides contention free channel access periods, contention channel access periods, or a combination thereof, at a higher frequency than Institute of Electrical and Electronics Engineers 802.11 superframes.

5. The method of claim 1, wherein the thin beacon time interval is determined based on the traffic characteristics of one or more applications supported by the wireless local area network cell.

6. The method of claim 1, wherein a size of the thin beacon message is a smaller size than a corresponding size of each beacon message of the sequence of beacon messages.

7. The method of claim 1, wherein the thin beacon message is transmitted at a thin beacon transmission rate that is a higher rate than a transmission rate associated with an Institute of Electrical and Electronics Engineers 802.11 beacon message.

8. The method of claim 1, wherein the thin contention-free period has a shorter duration than the contention-free period.

9. The method of claim 1, wherein the thin contention period has a shorter duration than the contention period.

10. The method of claim 1, wherein each beacon message of the sequence of beacon messages comprises an identification of a basic service set associated with the access point, and wherein the thin beacon message includes the identification of the basic service set associated with the access point.

11. The method of claim 1, further comprising transmitting at least one pair of sequential thin beacon messages during one of the beacon time intervals.

12. The method of claim 1, wherein at least one boundary of the thin beacon time interval is aligned with a particular boundary of the beacon time interval.

13. The method of claim 1, wherein the thin beacon message is transmitted during the contention period of the beacon time interval.

14. The method of claim 1, wherein the thin beacon message includes a subset of fields included in a particular beacon message, and wherein the thin beacon message has a shorter duration than the particular beacon message.

15. A computer readable storage device comprising instructions that, when executed by a processor, cause the processor to perform operations including:
    transmitting a sequence of beacon messages from an access point in a wireless local area network cell, each pair of sequential beacon messages within the sequence of beacon messages separated by a beacon time interval comprising a contention-free period and a contention period, and
    transmitting a thin beacon message during the beacon time interval, the thin beacon message followed subsequently by a thin beacon time interval that is less than the beacon time interval, wherein the thin beacon time interval comprises at least one of a thin contention-free period, a thin contention period, or a combination thereof.

16. The computer readable storage device of claim 15, wherein the thin beacon time interval is less than a duration of a superframe comprising at least one beacon message of the sequence of beacon messages, and wherein the thin beacon time interval provides contention free channel access periods, contention channel access periods, or a combination thereof, at a higher frequency than Institute of Electrical and Electronics Engineers 802.11 superframes.

17. The computer readable storage device of claim 15, wherein the thin beacon time interval is determined based on the traffic characteristics of one or more applications supported by the wireless local area network cell.

18. The computer readable storage device of claim 15, wherein a size of the thin beacon message is a smaller size than a corresponding size of each beacon message of the sequence of beacon messages, and wherein the thin beacon message is transmitted at a thin beacon transmission rate that is a higher rate than a transmission rate associated with an Institute of Electrical and Electronics Engineers 802.11 beacon message.

19. A wireless access point comprising:

a processor; and a wireless transceiver coupled to the processor, the wireless transceiver configured to:

transmit a sequence of beacon messages, each pair of sequential beacon messages within the sequence of beacon messages separated by a beacon time interval comprising a contention-free period and a contention period;

transmit a thin beacon message during the beacon time interval, the thin beacon message followed subsequently by a thin beacon time interval that is less than the beacon time interval, wherein the thin beacon time interval comprises at least one of a thin contention-free period, a thin contention period, or a combination thereof.

20. The wireless access point of claim 19, wherein the thin beacon time interval provides contention free channel access periods, contention channel access periods, or a combination thereof, at a higher frequency than Institute of Electrical and Electronics Engineers 802.11 superframes.

* * * * *